US011953180B2

(12) United States Patent
Ngom

(10) Patent No.: US 11,953,180 B2
(45) Date of Patent: Apr. 9, 2024

(54) DEVICE AND SYSTEM FOR A LIGHT STICK SLEEVE

(71) Applicant: Mbissine M. Ngom, Port Orange, FL (US)

(72) Inventor: Mbissine M. Ngom, Port Orange, FL (US)

( * ) Notice: Subject to any disclaimer, the term of this patent is extended or adjusted under 35 U.S.C. 154(b) by 0 days.

(21) Appl. No.: 17/955,728

(22) Filed: Sep. 29, 2022

(65) Prior Publication Data

US 2023/0102102 A1 Mar. 30, 2023

Related U.S. Application Data

(60) Provisional application No. 63/250,512, filed on Sep. 30, 2021.

(51) Int. Cl.
*F21V 15/01* (2006.01)
*F21L 4/00* (2006.01)

(52) U.S. Cl.
CPC ................ *F21V 15/01* (2013.01); *F21L 4/00* (2013.01)

(58) Field of Classification Search
CPC ...... F21V 15/01; F21V 17/002; F21V 21/406; F21L 4/00; F21W 2121/00
See application file for complete search history.

(56) References Cited

U.S. PATENT DOCUMENTS 5,036,442 A * 7/1991 Brown ................... A63B 15/02 362/249.14
5,079,679 A * 1/1992 Chin-Fa .................... F21L 4/02 362/202
5,279,513 A * 1/1994 Connelly ............. A63H 33/009 446/485
5,697,695 A * 12/1997 Lin ........................... F21L 4/02 362/184
6,213,623 B1 * 4/2001 Campman ................. F21L 4/02 362/205
6,217,187 B1 * 4/2001 Demsko .................... F21K 2/06 362/102
6,791,816 B2 * 9/2004 Stethem .................. F41B 15/04 463/47.4
7,311,261 B1 * 12/2007 Kennedy ................ G02B 27/20 235/472.01
7,661,594 B2 * 2/2010 Kennedy ................ G02B 27/20 235/462.22
7,703,966 B2 * 4/2010 Waters ....................... F21L 4/00 362/120
7,736,237 B2 * 6/2010 Stethem ..................... F41H 9/10 463/47.3
8,430,522 B2 * 4/2013 Ford ....................... F21V 17/06 362/108

(Continued)

*Primary Examiner* — Tsion Tumebo

(74) *Attorney, Agent, or Firm* — Law Office John R. Nelson, PA; John R. Nelson

(57) ABSTRACT

A device and system for a light stick sleeve comprising a hollow tube; an open end; a closed end; a wrist strap cut out; a hole cut out; a switch hole cut out; a knock-out for each of a hole cut out and a switch hole cut out; a wrist strap cut out. A user may customize and re-use a light stick sleeve to give a personalized experience. A user of a device and system for a light stick sleeve would decorate and customize a light stick sleeve, select a K-pop light stick, insert a K-pop light stick into a light stick sleeve, and use a customized K-pop light stick.

11 Claims, 8 Drawing Sheets

(56) References Cited

U.S. PATENT DOCUMENTS

| | | | | |
|---|---|---|---|---|
| 8,556,446 | B2 * | 10/2013 | Campman | F21V 9/08 362/120 |
| 2003/0165042 | A1 * | 9/2003 | Stethem | F21V 33/0076 361/232 |
| 2006/0203478 | A1 * | 9/2006 | Waters | F21L 4/00 362/217.13 |
| 2007/0019398 | A1 * | 1/2007 | Chen | F16M 13/04 362/102 |
| 2008/0068820 | A1 * | 3/2008 | Patel | F21L 4/00 362/217.05 |
| 2009/0135617 | A1 * | 5/2009 | Ford | F21V 11/12 362/382 |
| 2010/0157582 | A1 * | 6/2010 | Bertken | F21L 4/02 362/158 |
| 2011/0204825 | A1 * | 8/2011 | Yu | F21V 3/04 315/313 |
| 2012/0275142 | A1 * | 11/2012 | Lundy | F21L 4/027 362/184 |
| 2013/0264966 | A1 * | 10/2013 | Hazawa | G09F 9/33 315/297 |
| 2014/0111981 | A1 * | 4/2014 | Watanabe | F21L 13/06 362/184 |
| 2015/0251077 | A1 * | 9/2015 | Pedersen | A45B 9/02 280/821 |

* cited by examiner

DEVICE AND SYSTEM FOR A LIGHT STICK SLEEVE

RELATED APPLICATIONS

This application claims priority to U.S. Provisional Patent Application No. 63/250,512, filed on Sep. 30, 2021 which is incorporated herein by reference in its entirety, including any addendums, appendixes, and attachments thereto, to the extent that application does not conflict with the present disclosure herein.

BACKGROUND

The following discussion is not to be deemed admitted prior art but merely related art to show possible background and information related to K-pop light sticks.

A genre of music exists, Korean pop-music, referred to as "K-pop".

Within the culture of K-pop, a light stick exists. K-pop light sticks enable a singer or artist to look across the crowd and see a mass of color, patterns, and music matching light shows.

K-pop fans use different models of K-pop light sticks for different artists.

Many fans desire a way to also customize a light stick.

Currently, there are solutions to customize a light stick. Some of these solutions use glue to add decorations to the handle of a light stick. Still, other solutions use paint or markers to customize the handle of a light stick. Still, other solutions use wires, string, decals, or appliques to customize the handle of a light stick. Still, other solutions use vinyl wraps to customize the handle of a light stick.

Each of these solutions fails to meet the needed solution because they do not allow a user to subsequently customize a light stick after making modifications and therefore a light stick owner would have to purchase multiple light sticks.

Therefore, a need exists for a novel device to use as a re-usable and exchangeable sleeve that can be personalized and customized.

BRIEF SUMMARY OF THE INVENTION

This invention relates generally to, but is not limited to, a K-pop light stick sleeve.

Disclosed are numerous aspects of a unique and inventive apparatus and system for a light stick sleeve configured to receive, retain and protect a K-pop light stick (hereinafter referred to as a "light stick").

A device and system for a light stick sleeve case may be for a light stick of various sizes, having a plurality of controls.

It is desirable to have a device and system for a light stick sleeve. Furthermore, it is desirable to have a device and system for a light stick sleeve that can be easily attached to and removed from a light stick. Furthermore, it is desirable to have a device and system for a light stick sleeve that can be uniquely decorated and allow fans creativity. Furthermore, it is desirable to have a device and system for a light stick sleeve that can be custom decorated allowing fan creativity and the ability to easily change sleeves at a K-pop event. Furthermore, it is desirable to have a device and system for a light stick sleeve that fits a light stick handle and allows for full operation of a light stick. Furthermore, it is desirable to have a device and system for a light stick sleeve because light sticks are expensive and a device and system for a light stick sleeve maintains the original condition of a light stick.

The disclosed invention advantageously fills these needs and addresses the aforementioned deficiencies by providing an easy-to-use, customizable, exchangeable, protective sleeve for a light stick.

BRIEF DESCRIPTION OF THE DRAWINGS

A device and system for a light stick sleeve is illustrated by way of example, and not by way of limitation, in the figures of the accompanying drawings.

While aspects of a device and system for a light stick sleeve will be described with reference to the details of the embodiments of the invention shown in the drawings (and some embodiments not shown in the drawings), these details are not intended to limit the scope of the invention.

LIST OF FIGURE ITEMS

Figure 1:
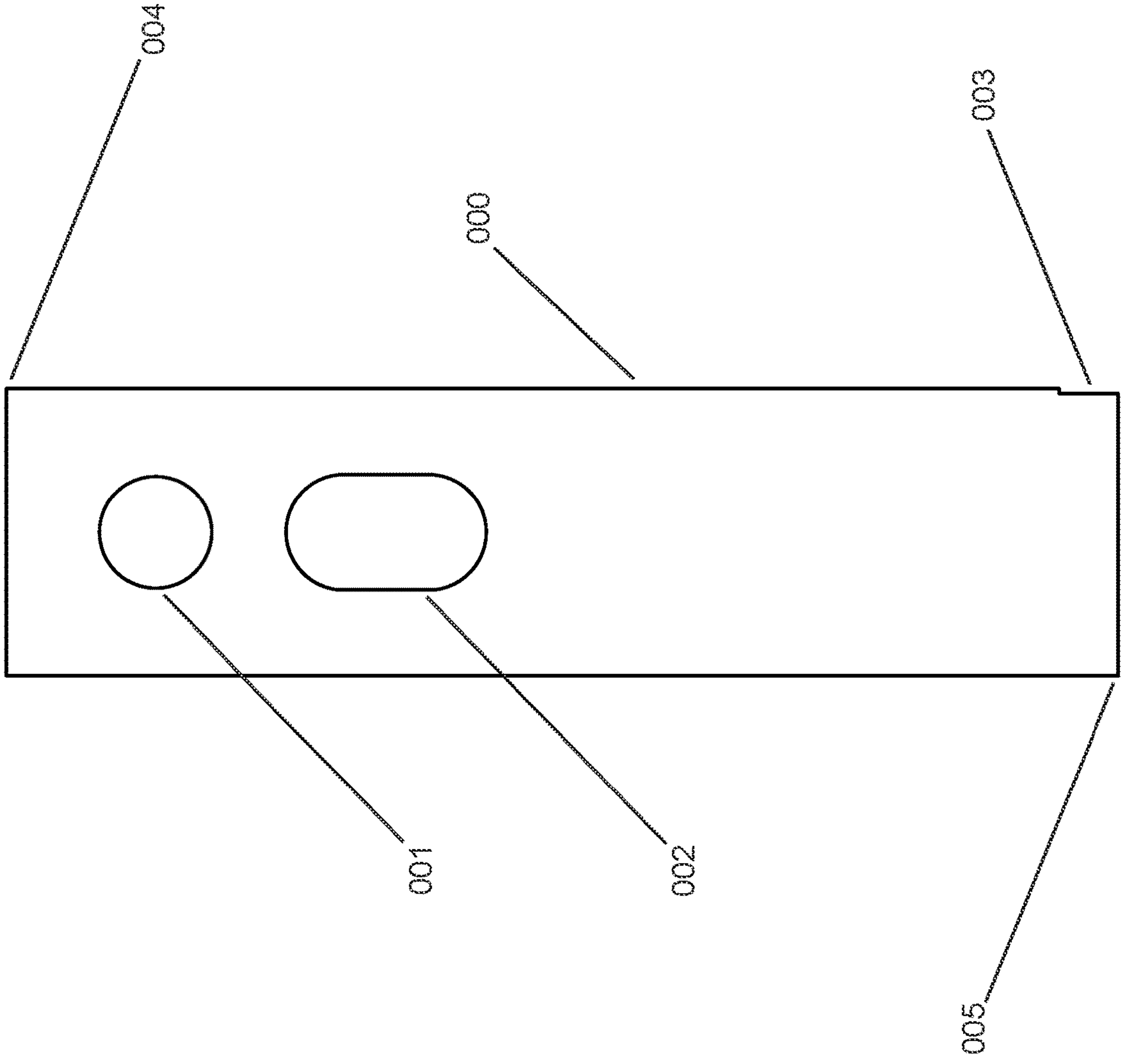
FIG. 1. A side view of a device and system for a light stick sleeve.

| | |
|---|---|
| 000 | A hollow tube |
| 001 | A hole cut out |
| 002 | A switch hole cut out |
| 003 | A wrist strap cut out |
| 004 | An open end |
| 005 | A closed end |
| 006 | A sample K-pop light stick |

DETAILED DESCRIPTION

The order of the steps of disclosed processes may be altered within the scope of the invention.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. A device and system for a light stick sleeve may, however, be embodied in many different forms and should not be construed as being limited to the embodiments set forth herein; rather, these embodiments are provided by way of illustration only and so that this disclosure will be thorough, complete and fully convey understanding to those skilled in the art.

For the purposes of promoting an understanding of the principles of a device and system for a light stick sleeve, reference will now be made to the embodiments illustrated in the drawings and specific language will be used to describe the same, only as examples and not intended to be limiting.

Light sticks, as used herein may be, a flashlight, an LED stick, powered by batteries or rechargeable means, may or may not have wireless capabilities such as Bluetooth or Wi-Fi.

Disclosed is a device and system for a light stick sleeve, comprising the following components: (1) a hollow tube 000; (2) an open end 004; (3) a closed end 005; (4) a wrist strap cut out 003; (5) a hole cut out 001; (6) a switch hole cut out 002.

These components, generally speaking, are configured as follows: (1) a hollow tube 000 has an open end 004 and a closed end 005; (2) longitudinally and of a correct distance a hole cut out 001 is near an open end 004 of a hollow tube 000; (3) a switch hole cut out 002 is on the same longitudinal line as a hole cut 001 out and located farther from an open end 004 than a hole cut out 001; (4) ninety-degrees from a longitudinal line of the hole cut out 001 and switch cut 002 out at a closed end 005 of a hollow tube 000 is a wrist strap cut out 003.

A device and system for a light stick sleeve may also have one or more of the following: additional cut outs for other accessories; different cut out 001, 002 placements; a built in wrist strap; a varying surface texture; tapering of a hollow tube; a mechanism to secure a hollow tube.

The disclosed apparatus and system for a light stick sleeve is unique when compared with other known devices and solutions because it provides: (1) customization of a light stick; (2) clear access to the functions of a light stick; (3) normal visibility of a light stick; (4) saves money for a consumer; (5) re-usability; (6) efficient swapping of different light stick sleeves.

The disclosed apparatus and system for a light stick sleeve is unique in that it is structurally different from other known devices or solutions. More specifically, the device is unique due to the presence of (1) a durable material available for re-use; (2) varying size and shape to fit different light sticks.

In some embodiments of versions of a device and system for a light stick sleeve a hollow tube 000 may be made of materials like, but not limited to, plastic, ABS, TPE or TPU, PLA, HIPS, PET, PETG, Nylon, ASA, Polypropylene, PVA, metal, carbon fiber, laminated paper, vinyl, bamboo.

In some embodiments of versions of a device and system for a light stick sleeve a hollow tube 000 is of a length, not meant to be limiting, of 5 cm to 50 cm (approximately 2 inches to 20 inches); a diameter not meant to be limiting, of 1 cm to 7.5 cm (approximately ½ inches to 3 inches); a thickness, not meant to be limiting, of 2 mm to 13 mm (approximately ⅒ inch to ½ inches).

In some embodiments of versions of a device and system for a light stick sleeve a hollow tube 000 is painted, colored, and/or textured.

In some embodiments of versions of a device and system for a light stick sleeve a hollow tube 000 may be tapered, having a different radius for each of an open end 004 and a closed end 005.

In some embodiments of versions of a device and system for a light stick sleeve a hollow tube 000 may have a mechanism to secure a hollow tube to a light stick 006 like, but not limited to, adhesive, foam, spacers, tension spacers.

In some embodiments of versions of a device and system for a light stick sleeve a hollow tube 000 may have a mechanism via a collar and coupling to secure a light stick 006 and hollow tube 000. Said collar would be made of similar material to a hollow tube 000 and may be, but not limited to, a threaded coupling, a snap lock fitting.

In some embodiments of versions of a device and system for a light stick sleeve a collar for securing a hollow tube 000 may be secured via adhesive and permanently mounted to a light stick 006 to allow multiple apparatus and system for a light stick sleeve to attach and disconnect quickly.

In some embodiments of versions of a device and system for a light stick sleeve a hole cut out 001 a switch hole cut out 002 is of a length, not meant to be limiting, of 6 mm to 25 mm (approximately ¼ inches to 1 inch), and a width of 6 mm to 25 mm (approximately ¼ inches to 1 inch).

In some embodiments of versions of a device and system for a light stick sleeve a plurality of a hole cut out 001 may be present.

In some embodiments of versions of a device and system for a light stick sleeve a plurality of a switch hole cut out 002 may be present.

In some embodiments of versions of a device and system for a light stick sleeve a hole cut out 001 or a switch hole cut out 002 may be of a shape, but not limited to, a circle, oval, tee, hexagonal, key hole, triangular, diamond, star, octagon, pentagon.

In some embodiments of versions of a device and system for a light stick sleeve a hole cut out 001 or a switch hole cut out 002 may be a knock-out meant to be removed by a light stick 006 user if desired.

In some embodiments of versions of a device and system for a light stick sleeve a wrist strap cut out 003 may be of the same material as a hollow tube 000 or may be made of metal.

In some embodiments of versions of a device and system for a light stick sleeve a wrist strap cut out 003 may be located anywhere on the outside edge of a closed end 005.

In some embodiments of versions of a device and system for a light stick sleeve a key ring may be attached to a hollow tube 000.

In some embodiments of versions of a device and system for a light stick sleeve in its most complete version comprise the following components: (1) a hollow tube 000; (2) an open end 004; (3) a closed end 005; (4) a wrist strap cut out 003; (5) a hole cut out 001; (6) a switch hole cut out 002; (7) a knock-out for each of a hole cut out 001 and a switch hole cut out 002; (8) a metal wrist strap cut out 003.

In some embodiments of versions of a device and system for a light stick sleeve these components are connected as follows to result in a single system: (1) a hollow tube 000 has an open end 004 and a closed end 005; (2) a hole cut out 001 and a switch hole cut out 002 are located appropriately for a particular light stick make and model; (3) a wrist strap cut out 003 is located at a closed end 005.

FIG. 1. Shows a side view of a preferred embodiment of a device and system for a light stick sleeve. A closed end 005 is located at the base of a hollow tube and has a wrist strap cut out 003; an open end 004 is at the top of a hollow tube 000; a hole cut out 001 and a switch hole cut out 002 are located longitudinally on one side of a hollow tube 000.

Figure 2:
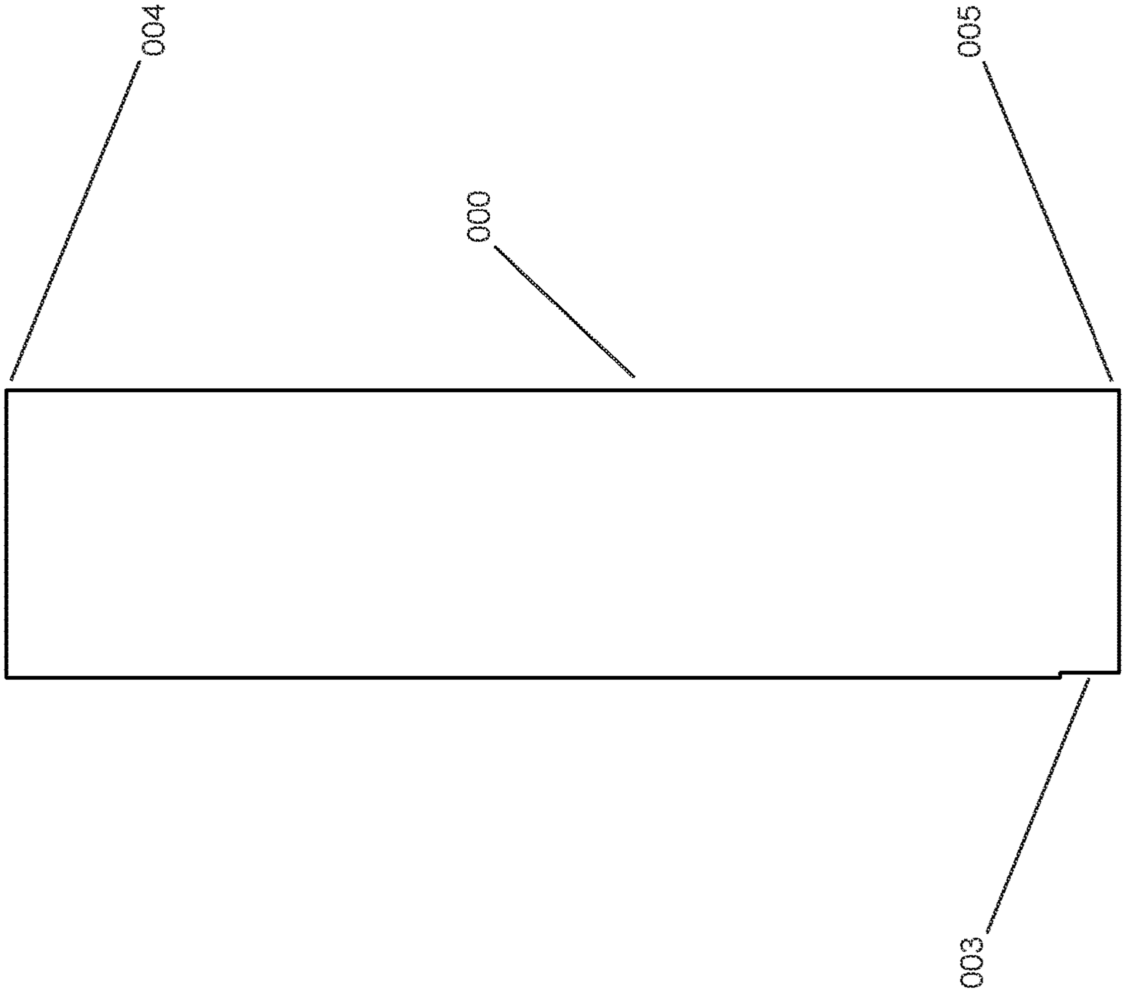
FIG. 2. A side view of a device and system for a light stick sleeve rotated 180 degrees from FIG. 1.

FIG. 2. Shows a side view of FIG. 1, a preferred embodiment of a device and system for a light stick sleeve, rotated 180-degrees from FIG. 1.

Figure 3:
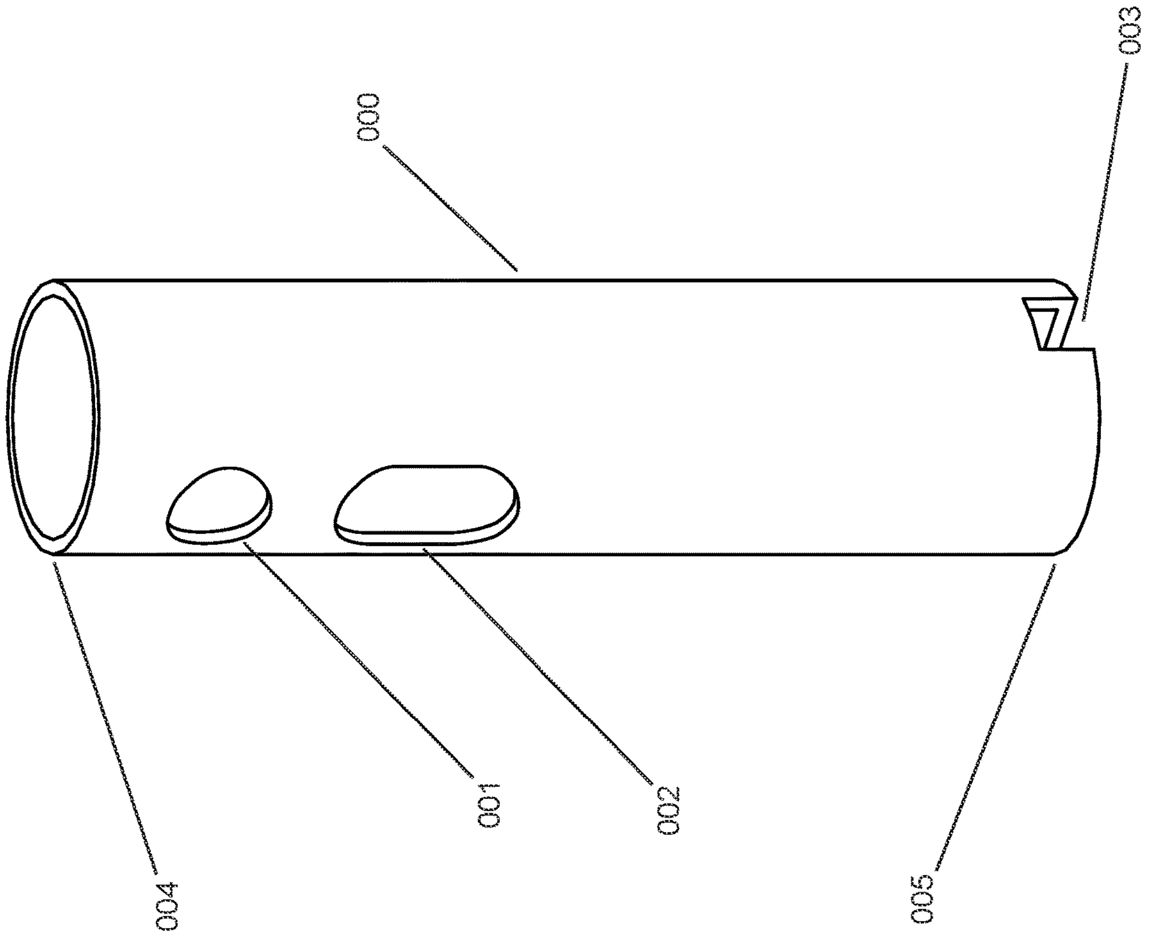
FIG. 3. A perspective view of a device and system for a light stick sleeve.

FIG. 3. Shows a perspective view of a preferred embodiment of a device and system for a light stick sleeve. A closed end 005 is located at the base of the hollow tube and has a wrist strap cut out 003; an open end 004 is at the top of a hollow tube 000; a hole cut out 001 and a switch hole cut out 002 are located longitudinally on one side of a hollow tube 000.

Figure 4:
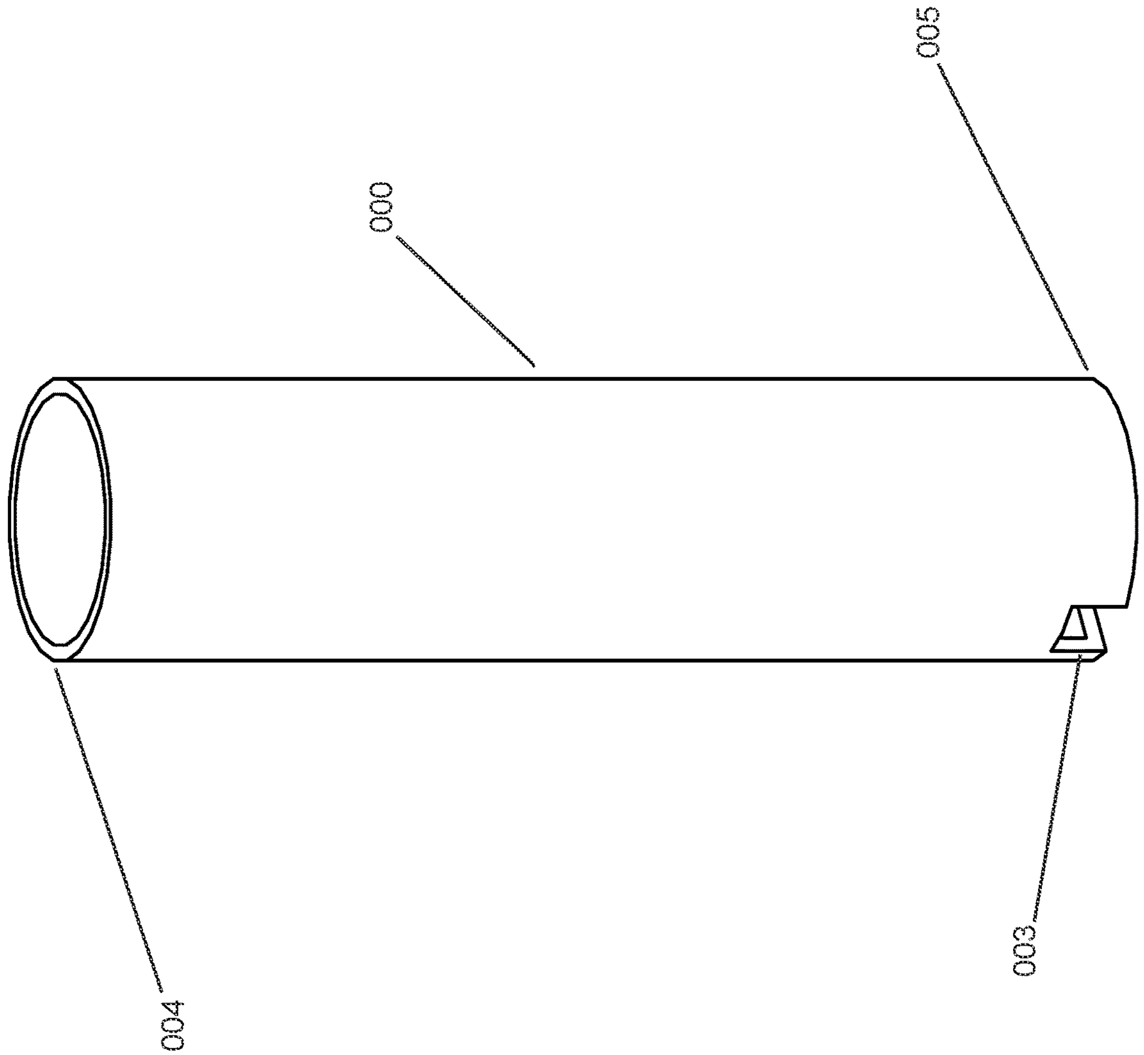
FIG. 4. A perspective view of a device and system for a light stick sleeve rotated 180 degrees from FIG. 2.

FIG. 4. Shows a perspective view of a preferred embodiment of a device and system for a light stick sleeve, rotated 180-degrees from FIG. 3.

Figure 5:
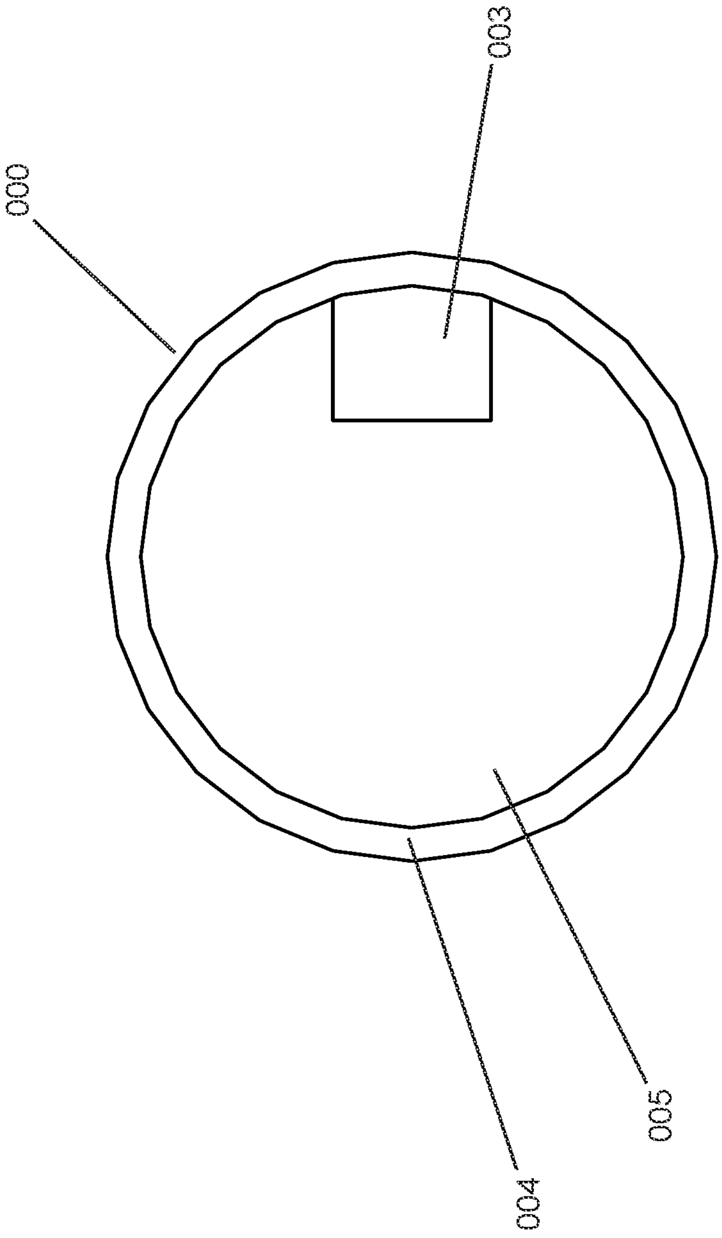
FIG. 5. A top view of a device and system for a light stick sleeve.

FIG. 5. Shows a top view of a preferred embodiment of a device and system for a light stick sleeve. An open end 004 is at the top of a hollow tube 000 and a closed end 005 is visible through a hollow tube 000. A wrist strap cut out is located on a closed end 005.

Figure 6:
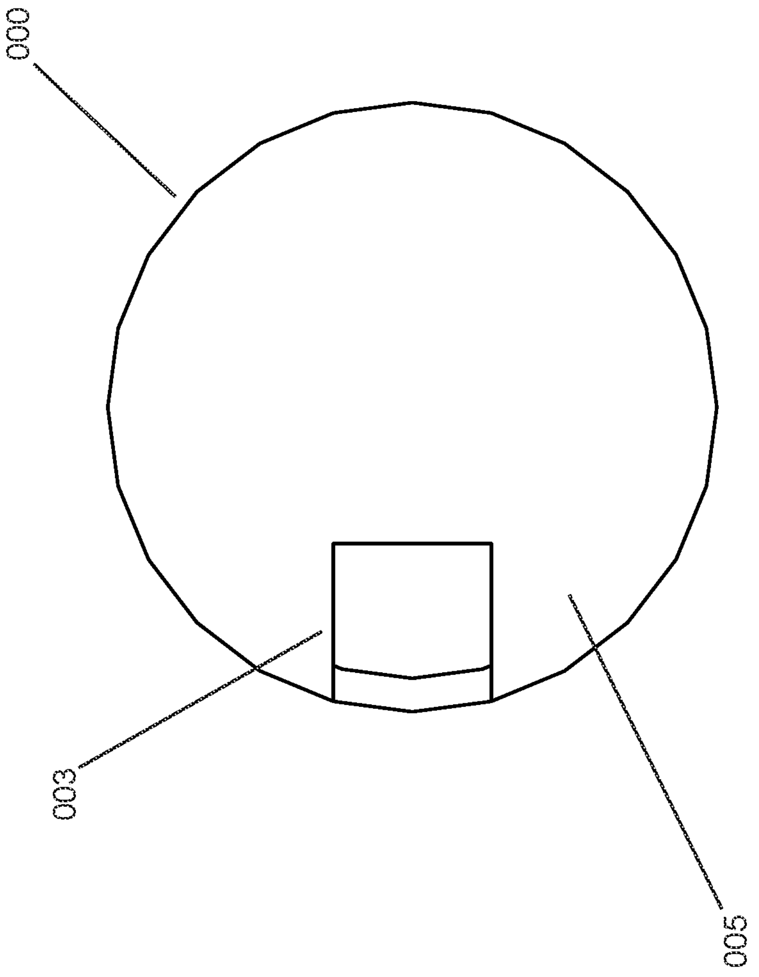
FIG. 6. A bottom view of a device and system for a light stick sleeve.

FIG. 6. Shows a bottom view of a preferred embodiment of a device and system for a light stick sleeve. A closed end 005 is connected to hollow tube 000. A wrist strap cut out is located on a closed end 005.

Figure 7:
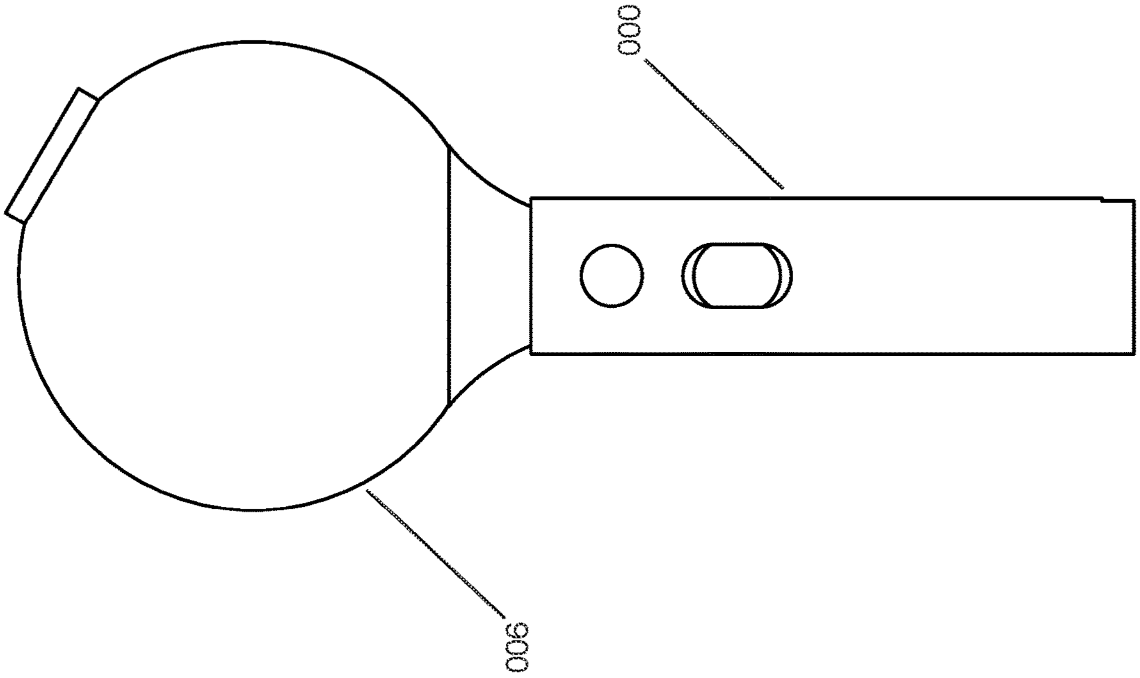
FIG. 7. A side view of a device and system for a light stick sleeve, with a sample K-pop light stick in a hollow tube.

FIG. 7. A side view of a device and system for a light stick sleeve, with a sample K-pop light stick 006 in said hollow tube 000.

Figure 8:
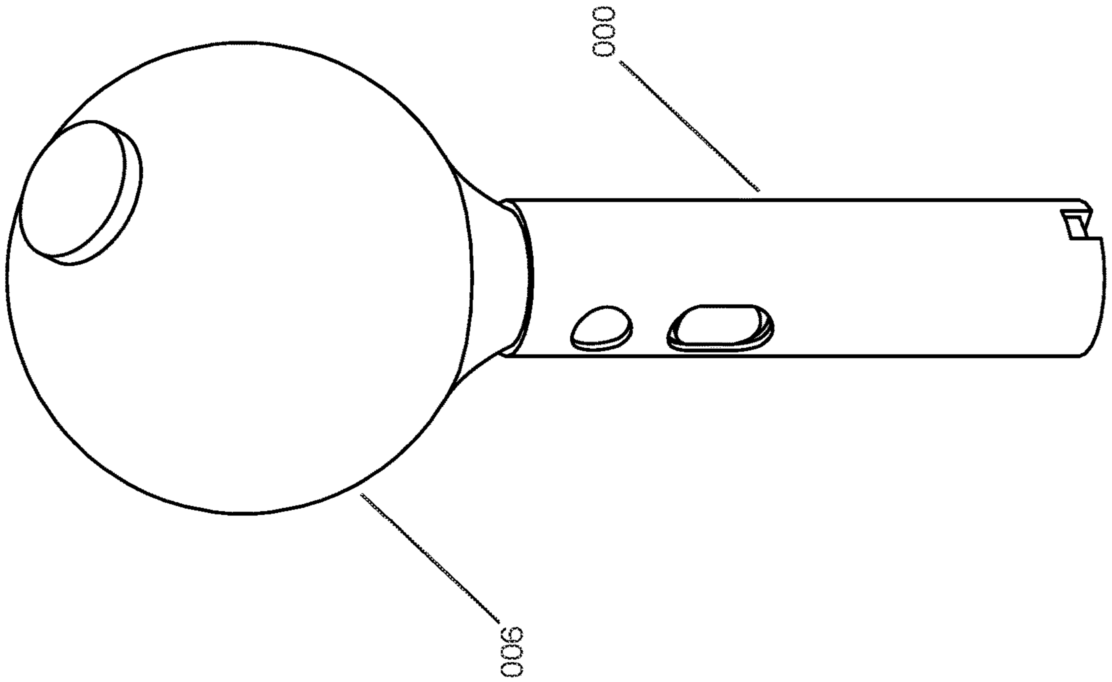
FIG. 8. A perspective view of a device and system for a light stick sleeve, with a sample K-pop light stick in a hollow tube.

FIG. 8. A perspective view of a device and system for a light stick sleeve, with a sample K-pop light stick 006 in said hollow tube 000.

Versions of the invention may be a method of adapting a light stick with a device and system for a light stick sleeve, comprising: selecting a hypothetical light stick 006 appropriate for a device and system for a light stick sleeve comprising a hollow tube 000; an open end 004; a closed end 005; a wrist strap cut out 003; a hole cut out 001; a switch hole cut out 002.

Versions of a device and system for a light stick sleeve may be made individually, in batches, or via continuous assembly.

For example, to make a version of a device and system for a light stick sleeve prepare an appropriate work surface and assemble all of the components disclosed herein. Assemble the raw materials in a logical order as someone skilled in the art would do. As an example, not meant to be limiting, start with a 3D printer; raw material to use in the 3D printer. Prepare the 3D printer by loading the plans and graphics for a light stick sleeve. Start the printer and watch as the light stick sleeve is printed.

An example of using a device and system for a light stick sleeve comprises selecting an appropriate concert light stick; selecting a device and system for a light stick sleeve and decorating said light stick sleeve as desired; inserting a concert light stick into a light stick sleeve, aligning buttons and controls on a concert light stick with a hole cut out and a switch hold cut out, attaching a wrist strap or lanyard to a wrist strap cut out.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The embodiments of a device and system for a light stick sleeve may be utilized individually, concurrently, or in any sequential combination.

Those skilled in the art to which this application relates will appreciate that other and further additions, deletions, substitutions and modifications may be made to the described embodiments.

The specification is not to be taken in a limiting sense, but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, but the invention is not limited to any embodiment. The scope of the invention is limited only by the claims and the invention encompasses numerous alternatives, modifications and equivalents. Several specific details are set forth in the description to provide a thorough understanding of the invention. These details are provided for the purpose of example and the invention may be practiced according to the claims without some or all of these specific details. In general, the order of the steps of disclosed processes may be altered within the scope of the invention.

Unless otherwise indicated, the drawings are intended to be read (e.g., arrangement of parts, proportion, degree, etc.) together with the specifications, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

What is claimed:

1. A device and system for a light stick sleeve, comprising:

a hollow tube of a given length, thickness, and diameter;

wherein said hollow tube has an open end, and a closed end, said hollow tube adapted to move slidably over a handle portion of the light stick enveloping said handle portion and accessories provided thereupon;

a wrist strap cut out;

a hole cut out; and a switch hole cut out, wherein the hole cut out and the switch hole cut out are provided along a longitudinal line near an open end of the hollow tube and are dimensioned to align buttons and controls on said light stick, wherein the wrist cut out is provided at a right angle to a longitudinal alignment of the hole cut out and the switch hole cut out at the closed end.

2. The device and system for a light stick sleeve of claim 1 wherein the hollow tube is made from a material selected from the group consisting of plastic, ABS, TPE, TPU, PLA, HIPS, PET, PETG, Nylon, ASA, Polypropylene, PVA, metal, carbon fiber, laminated paper, vinyl, bamboo.

3. The device and system for a light stick sleeve of claim 1 wherein the hollow tube is painted, colored, or textured.

4. The device and system for a light stick sleeve of claim 1 wherein the hollow tube is tapered.

5. The device and system for a light stick sleeve of claim 1 wherein the hollow tube has a plurality of a hole cut out.

6. The device and system for a light stick sleeve of claim 1 wherein the hollow tube has a plurality of a switch hole cut out.

7. The device and system for a light stick sleeve of claim 1 wherein the hole cut out is of a shape selected from the group consisting of circle, oval, tee, hexagonal, key hole, triangular, diamond, star, octagon, pentagon.

8. The device and system for a light stick sleeve of claim 1 wherein the switch hole cut out is of a shape selected from the group consisting of circle, oval, tee, hexagonal, key hole, triangular, diamond, star, octagon, pentagon.

9. The device and system for a light stick sleeve of claim 1 further comprising a light stick.

10. A system for a light stick sleeve, comprising:

a hollow tube of a given length, thickness, and diameter;

wherein said hollow tube has an open end, and a closed end, said hollow tube adapted to move slidably over a handle portion of the light stick enveloping said handle portion and accessories provided thereupon;

a wrist strap cut out;

a hole cut out; and a switch hole cut out, wherein the hole cut out and the switch hole cut out are provided along a longitudinal line near an open end of the hollow tube and are dimensioned to align buttons and controls on said light stick, wherein the wrist cut out is provided at a right angle to a longitudinal alignment of the hole cut out and the switch hole cut out at the closed end.

11. A method of using a light stick with a device and system for a light stick sleeve, comprising:

selecting a light stick appropriate for a device and system for a light stick sleeve; and using a device and system for a light stick sleeve comprising a hollow tube wherein said hollow tube has an open end and a closed end; a wrist strap cut out; a hole cut out; and a switch hole cut out; and wherein placing the light stick in a device and system for a light stick sleeve allows use of the light stick.

* * * * *